United States Patent [19]

Griffiths et al.

[11] 4,031,109

[45] June 21, 1977

[54] METHOD FOR THE PREPARATION OF X-FORM METAL PHTHALOCYANINE AND X-FORM METAL FREE COMPOUNDS

[75] Inventors: Clifford H. Griffiths, Brighton; Richard C. Keezer, Pittsford, both of N.Y.

[73] Assignee: Xerox Corporation, Stamford, Conn.

[22] Filed: Nov. 22, 1972

[21] Appl. No.: 308,915

Related U.S. Application Data

[63] Continuation-in-part of Ser. No. 756,363, Aug. 30, 1968, abandoned.

[52] U.S. Cl. .............................. 260/314.5; 96/1.5
[51] Int. Cl.² ........................................ C09B 47/04
[58] Field of Search .............................. 260/314.5

[56] References Cited

UNITED STATES PATENTS

| | | | |
|---|---|---|---|
| 2,285,359 | 6/1942 | Rosch et al. | 260/314.5 |
| 2,288,478 | 6/1942 | Nadler et al. | 260/314.5 |
| 2,290,906 | 7/1942 | Coffey et al. | 260/314.5 |

OTHER PUBLICATIONS

Moser, et al., Phthalocyanine Compounds, pp. 23–28 & 308 (1963).

*Primary Examiner*—John D. Randolph
*Attorney, Agent, or Firm*—James J. Ralabate

[57] ABSTRACT

A method for the preparation of X-form metal phthalocyanine and X-form metal-free compounds which comprises heating any suitable metal phthalocyanine polymorph or compound to from about 600° to about 650° and cooling the resulting product formed thereby is herein disclosed.

11 Claims, No Drawings

METHOD FOR THE PREPARATION OF X-FORM METAL PHTHALOCYANINE AND X-FORM METAL FREE COMPOUNDS

This application is a continuation-in-part of Ser. No. 756,363 filed Aug. 30, 1968, now abandoned.

BACKGROUND OF THE INVENTION

This invention relates to phthalocyanine photoconductive materials and, more particularly, to a novel process for the preparation of X-form metal phthalocyanine.

It is known that images may be formed and developed on the surface of certain photoconductive materials by electrostatic means. The basis xerographic process, as taught by Carlson in U.S. Pat. No. 2,297,691, involves uniformly charging a photoconductive insulating layer and then exposing the layer to a light-and-shadow image which dissipates charge on the portions of the layer which are exposed to light. The electrostatic image formed on the layer corresponds to the configuration of the light-and-shadow image. This image is rendered visible by depositing on the imaged layer a finely divided developing material comprising a colorant called a toner and a toner carrier. The powder developing carrier will normally be attracted to those portions of the layer which retain a charge, thereby forming a powder image corresponding to the latent electrostatic image. This powder image may then be transferred to paper and other receiving surfaces. The paper then will bear the powder image which may subsequently be made permanent by heating or other suitable fixing means. The above general process is also described in U.S. Pat. Nos. 2,357,809; 2,891,011, and 3,079,342.

Phthalocyanine, which also is known as tetrabenzotetraazaporphin and tetrabenzoporphyrazine, may be said to be the condensation product of four isoindole groups. Metal-free phthalocyanine has the following general structure:

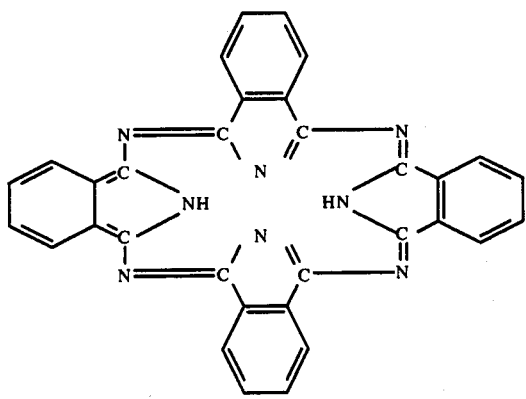

In addition to the metal-free phthalocyanine of the above structure, various metal derivatives of phthalocyanine are known in which the two hydrogen atoms in the center of the molecule are replaced by metals from any group of the periodic table. Also, it is well known that from one to sixteen of the peripheral hydrogen atoms in the four benzene rings of the phthalocyanine molecule may be replaced by halogen atoms and by numerous organic and inorganic groups. The following discussion is directed primarily to substituted and unsubstituted metal phthalocyanines.

Metal phthalocyanines are known to exist in at least three well known polymorphic forms, namely, the alpha, beta and gamma forms. These forms may be easily distinguished by comparison of their X-ray diffraction patterns and/or infrared spectra. There is some question whether the reported gamma form is actually a separate polymorph, or is instead merely a less crystalline form of alpha phthalocyanine. In addition to these three well known forms, which exist in both metal-containing and metal-free phthalocyanine, additional polymorphs of metal-containing phthalocyanine are known, i.e., R-form disclosed in U.S. Pat. No. 3,051,721, "delta" form described in U.S. Pat. No. 3,160,635 and another "delta" form described in U.S. Pat. No. 3,150,150.

In U.S. Pat. No. 3,357,989, it is disclosed that an especially sensitive form of meta-free phthalocyanine, known as "X metal-free" phthalocyanine, could be prepared by extended dry milling or grinding of the alpha or beta form metal-free phthalocyanine. In copending application Ser. No. 566,839, abandoned for continuation Ser. No. 10,077 now U.S. Pat. No. 3,594,163, a second method for the preparation of "X metal-free" phthalocyanine is disclosed and claimed. This method comprises mixing the alpha crystalline form of metal-free phthalocyanine with a portion of the X metal-free form and an aliphatic organic solvent, and maintaining the mixture until the alpha metal-free form is converted to the X metal-free form. Both of these methods are very time consuming and expensive.

The known methods of preparing metal-phthalocyanines include the reaction of phthalonitrile with a metal or metal salt in quinoline and trichlorobenzene; the reaction of phthalic anhydride, phthalic acid, or phthalamide, urea metal salts, and a catalyst; the reaction of o-cyanobenzamide with a metal; and the reaction of phthalocyanine or replaceable metal phthalocyanine with a metal forming a more stable phthalocyanine. The metal phthalocyanines prepared by the above methods are generally in the alpha or beta polymorphic forms.

Metal phthalocyanines are widely used in the preparation of inks and paints. However, one important drawback of using many of the known metal phthalocyanines in this mode is that they recrystallize in the presence of heat and strong solvents. Electrophotographic plates comprising metal phthalocyanines in a binder are disclosed in copending application Ser. No. 518,450, filed Jan. 3, 1966, now U.S. Pat. No. 3,816,118. One distinct disadvantage of employing said metal phthalocyanines in this mode is that they show low photosensitivities as compared to metal-free phthalocyanines. Thus, there is a continuing need for metal-phthalocyanines with greater electrical photosensitivities and greater stability to recrystallization in the presence of heat and strong solvents.

Copending application Ser. No. 756,365 now abandoned, filed in the U.S. Patent Office on Aug. 30, 1968, discloses and claims metal phthalocyanines in the X polymorphic form as well as a method for their preparation. More specifically, this method comprises rapidly sublimating a metal phthalocyanine polymorph under a pressure of about $10^{-1}$ to about $10^{-6}$ Torr. This method, while quite fast and while producing a high yield of substantially pure X-form metal phthalocyanine, requires the use of complex and expensive evaporation equipment, especially when it is desired to industrially prepare X-form metal phthalocyanine on a large scale.

Since large quantities of X-form metal phthalocyanine may be needed for electrophotographic, pigment, and/or other uses, there is a continuing need for a simpler, cheaper, less time consuming, and more reproducible method of preparing same.

It is, therefore, an object of this invention to provide a method of preparing X-form metal phthalocyanine and phthalocyanine compounds devoid of the above-noted disadvantages.

Another object of this invention is to provide a direct method for the preparation of X-form metal phthalocyanine and phthalocyanine compounds.

Still another object of this invention is to provide a more rapid method of preparing X-form metal phthalocyanine than previously known methods.

Yet another object of this invention is to provide a method of preparing substantially pure X-form phthalocyanine and phthalocyanine cmpounds wherein the yield of the resulting product is very high.

A further object of this invention is to provide a reliable and dependable method of preparing X-form metal phthalocyanine and phthalocyanine compounds which gives highly reproducible results.

Still another further object of this invention is to provide a method of preparing X-form metal phthalocyanine and phthalocyanine compounds which requires inexpensive heating and cooling techniques.

It is another object of this invention to provide an economical method of preparing X-form metal phthalocyanine and phthalocyanine compounds when it is to be produced on a large scale industrial level.

SUMMARY OF THE INVENTION

The foregoing objectives, and others, are accomplished in accordance with this invention, generally speaking, by providing a novel system for the preparation of X-form metal phthalocyanine and phthalocyanine compounds which comprises heating any metal phthalocyanine polymorph or phthalocyanine compound to from about 600° C to about 650° C and then, preferably, rapidly cooling preferably to from about 10° C to about 40° C in order to avoid decomposition of the X-form product. The principal advantages associated with the above method are that inexpensive industrial heating and cooling techniques may be employed for large scale production, purity is insured, yields are very high, the method gives highly resproducible results, among others.

Phthalocyanine itself is:

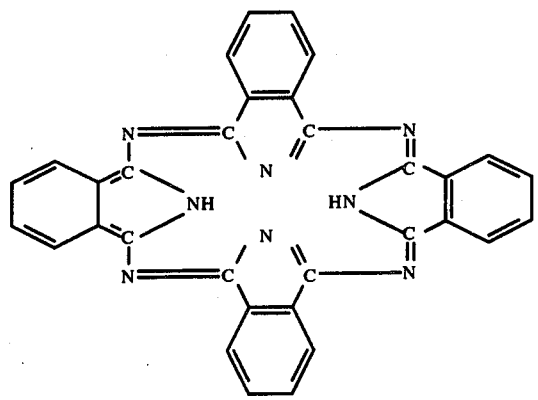

The phthalocyanine class of compounds includes metal derivatives of phthalocyanine. The two hydrogen atoms in the center of the molecule may be replaced by metals from every group of the periodic table to form the group of compounds known as the metal phthalocyanines. More than 40 such metal phthalocyanines have been prepared. Also from 1–16 of the peripheral hydrogen atoms in the four benzene rings in the phthalocyanine molecule have been replaced by halogen atoms and by numerous organic and inorganic groups. Several thousand different phthalocyanine compounds have thus been synthesized.

All phthalocyanine compounds absorb light on both sides of the blue-green portion of the visible spectrum. Therefore, "phthalocyanine" is an apt nomenclature for all members of the phthalocyanine class. In the art, phthalocyanine is known to embrace both specifically the molecule and the class of metal and metal free and peripherally substituted phthalocyanines. For purposes of the instant application, the term "phthalocyanine" shall define the molecule itself, the terms "metal" and "metal free", where employed, shall indicate centrally metal substituted or centrally unsubstituted phthalocyanine molecules respectively. The term "phthalocyanine compound", where employed, shall indicate that phthalocyanine molecule itself is peripherally substituted. Therefore, a typical designation of a phthalocyanine compound would be as follows: an alpha metal-free phthalocyanine compound which defines the alpha form of metal-free peripherally substituted phthalocyanine. On the other hand, alpha metal phthalocyanine defines an alpha form phthalocyanine which is metal centrally substituted and no peripherally substituted.

Any suitable metal phthalocyanine or phthalocyanine compound may be employed as a starting material of the instant invention. Metal phthalocyanines are known to exist in several different polymorphic forms, as described above which may be easily distinguished by comparison of the X-ray diffraction patterns and/or infrared spectra. Many of these metal phthalocyanines are described in "Phthalocyanine Compounds" by F. H. Moser and A. L. Thomas, Rheinhold Publishing Corporation, New York (1963). Typical metal phthalocyanines and phthalocyanine compounds include unsubstituted metal phthalocyanine, aluminum phthalocyanine, aluminum polychloro phthalocyanine, antimony phthalocyanine, barium phthalocyanine, beryllium phthalocyanine, cadmium hexadecachlorophthalocyanine, cadmium phthalocyanine, calcium phthalocyanine, cerium phthalocyanine, chromium phthalocyanine, cobalt phthalocyanine, cobalt chlorophthalocyanine, copper 4-aminophthalocyanine, copper bromochlorophthalocyanine, copper 4-chlorophthalocyanine, copper 4-nitrophthalocyanine, copper phthalocyanine, copper phthalocyanine sulfonate, copper polychlorophthalocyanine, deuteriometalphthalocyanine, dysprosium phthalocyanine, erbium phthalocyanine, europium phthalocyanine, gadolinium phthalocyanine, gallium phthalocyanine, germanium phthalocyanine, hafnium phthalocyanine, halogen substituted metal-phthalocyanine, holmium phthalocyanine, indium phthalocyanine, iron phthalocyanine, iron polyhalophthalocyanine, lanthanum phthalocyanine, lead phthalocyanine, lead polychlorophthalocyanine, cobalt hexaphenylphthalocyanine, copper pentaphenylphthalocyanine, lithium phthalocyanine, lutecium phthalocyanine, magnesium phthalocyanine, manganese phthalocyanine, mercury phthalocyanine, molybdenum phthalocyanine, neodymium phthalocyanine, nickel phthalocyanine, nickel polyhalophthalocyanine, osmium phthalocyanine, palladium phthalocyanine, palladium chlorophthalocyanine, alkoxymetalphthalocyanine, alkylaminometalphthalocyanine, alkylmercaptophthalocyanine, aralkylaminometalphthalocyanine, aryloxymetalphthalocyanine, arylmercaptophthalocyanine, copper phthalocyanine piperidine, cycloalkylaminometalphthalocyanine, dialkylaminometalphthalocyanine, diaralkylaminometalphthalocyanine, dicycloalkylaminometalphthalocyanine, hexadecahydrometalphthalocyanine, imidomethylphthalocyanine, octaazametalphthalocyanine, tetraazametalphthalocyanine, tetra-4-acetylaminometalphthalocyanine, tetra-4-aminobenzoylmetalphthalocyanine, tetra-4-aminometalphthalocyanine, tetrachloromethylmetalphthalocyanine, tetradiazometalphthalocyanine, tetra-4,4-dimethyloctaazametalphthalocyanine, tetra-4,5-diphenyloctaazametalphthalocyanine, tetra (6-methyl-benzothiazoyl) metal phthalocyanine tetra-p-methylphenylaminometalphthalocyanine, tetramethylmetalphthalocyanine, tetra-naphthotriazolylmetalphthalocyanine, tetra-4-naphthylmetalphthalocyanine, tetra-4-nitrometalphthalocyanine, tetra-peri-naphthylene-4,5-octaazametalphthalocyanine, tetra-2,3-phenyleneoxide metalphthalocyanine, tetra-4-phenyloctaazametalphthalocyanine, tetraphenylmetalphthalocyanine, tetraphenylmetalphthalocyanine, tetra-carboxylic acid, tetraphenylmetalphthalocyanine tetrabarium carboxylate, tetraphenylmetalphthalocyanine tetra-calcium carboxylate, tetrapyridymetalphthalocyanine, tetra-4-trifluoromethylmercaptophthalocyanine, tetra-4-trifluoromethylmetalphthalocyanine, 4,5-thionaphtheneneoctaazaphthalocyanine, platinum phthalocyanine, potassium phthalocyanine, rhodium phthalocyanine, samarium phthalocyanine, silver phthalocyanine, silicone phthalocyanine, sodium phthalocyanine, sulfonated metalphthalocyanine, thorium phthalocyanine, thulium phthalocyanine, tin chlorophthalocyanine, tin phthalocyanine, titanium phthalocyanine, uranium phthalocyanine, vanadium phthalocyanine, ytterbium phthalocyanine, zinc chlorophthalocyanine, zinc phthalocyanine. Together with, or in lieu of, the above metal phthalocyanines any suitable mixture, dimer, trimer, oligomer, polymer, copolymer or mixtures of metal phthalocyanines may be used. The phthalocyanine may also be in any suitable crystal form.

While any suitable metal phthalocyanine or phthalocyanine compounds may be used as the starting material of this invention, it is highly preferable to employ the alpha or beta form of unsubstituted copper phthalocyanine, lead phthalocyanine, cobalt phthalocyanine, or zinc phthalocyanine and their compounds in order to obtain a high yield of extremely pure X-form metal phthalocyanine in a minimum amount of time. Further, X-form copper, cobalt, lead and zinc phthalocyanines have been found to be particularly photosensitive. Optimum results are achieved with the alpha and beta forms of copper phthalocyanine and, accordingly, these are the most preferred starting materials.

Although the starting material of the present invention may be heated to any suitable temperature, a temperature of about 600° to about 650° C is found convenient. It is, however, preferred to heat said starting material to a temperature of about 625° C in order to obtain high yields of substantially pure X-form metal phthalocyanine and phthalocyanine compounds.

While any suitable heating rate may be employed in heating the starting material of the present invention, a rate of about 50° C/minute to about 150° C/minute is found convenient. However, it is preferred to employ a heating rate of about 100° C/minute in order to obtain especially high yields of the X-form metal polymorph or compound.

After heating the starting material, the resulting X-form phthalocyanine product should be rapidly cooled to a suitable temperature, as for example to a temperature of between about 10° and about 40° C in order to avoid decomposition. While the material may be rapidly cooled to any suitable temperature, best results are obtained when the resulting material is rapidly cooled to about 25° C.

While any suitable cooling rate may be employed in cooling the heated material, a rate of about 20° C/minute to about 200° C/minute works particularly well. It is preferred, however, to employ a cooling rate of about 100° C/minute in order to produce especially high yields of a substantially pure final product.

DESCRIPTION OF THE PREFERRED EMBODIMENTS

The following examples will further define various preferred embodiments of the present invention. Parts and percentages are by weight unless otherwise specified.

The resulting product produced in each of the following examples is analyzed by conventional X-ray and infrared analysis methods. The X-ray and infrared curves produced by the materials prepared in each of the following examples is compared to curves for known alpha, beta, and X-form phthalocyanine as described in detail in the above-mentioned U.S. Pat. No. 3,357,989 as well as to curves for the alpha, beta, and X-form polymorphs of the metal phthalocyanines. Moreover, a physical comparison is made between the prepared materials and their corresponding alpha and beta polymorphs.

EXAMPLE I

About 100 g. of beta-form copper phthalocyanine are placed in a quartz tube equipped with a thermometer and gas inlet tube. The starting material is then heated uniformly at a rate of about 100° C/minute to about 625° C by passing heated nitrogen through the phthalocyanine powder. The material is then rapidly cooled using nitrogen gas cooled at about −200° C, at a rate of about 100° C/minute until the resulting material reaches a temperature of about 25° C. Analysis indicates conversion to X-form copper phthalocyanine — yield, about 95%.

EXAMPLE II

The process of Example I is repeated using alpha copper phthalocyanine. Essentially the same results as in Example I are obtained.

EXAMPLES III – V

The process of Example I is repeated three successive times using beta cobalt phthalocyanine, beta lead phthalocyanine, and beta zinc phthalocyanine, respectively. Analysis indicates conversion to the X-metal form in each case — yields in the order of 90%.

EXAMPLES VI – X

The process of Example I is repeated five successive times using alpha cobalt phthalocyanine, alpha lead phthalocyanine, alpha zinc phthalocyanine, alpha cadmium phthalocyanine, and alpha magnesium phthalocyanine, respectively. Analysis indicates conversion to the X-metal form in each case — yields in the order of 90%.

EXAMPLE XI

As a control for the process of Example I, the starting material (beta-form copper phthalocyanine) is heated to about 550° C prior to cooling. No conversion to the X-form takes place.

EXAMPLE XII

As a further control for the process of Example I, the starting material is heated to about 680° C prior to cooling. Analysis indicates a total decomposition of the X-form polymorph.

EXAMPLES XIII – XVIII

About 50 g. each of beta copper phthalocyanine, alpha copper phthalocyanine, beta cobalt phthalocyanine, alpha lead phthalocyanine, beta zinc phthalocyanine, and alpha cadmium phthalocyanine are placed, respectively, on six separate steel plates and heated, using a gas burner, at a rate of about 100° C/minute to temperatures of about 625° C. The resulting products are then allowed to cool in the atmosphere. Analysis indicates a partial decomposition of the respective X-form metal polymorphs. Final yields of X-form metal phthalocyanine, after cooling, were found by X-ray and infrared analysis to be in the order of about 25% in each respective case.

While specific components of the present system are defined in the working examples above, any of the other typical materials or temperatures indicated above may be substituted in said working examples if appropriate. In addition, many other variables may be introduced in the present process, such as further purification steps or other reaction components which may in any way affect, enhance, or otherwise improve the present process.

While various specifics are cited in the present application, many modifications and ramifications will occur to those skilled in the art upon a reading of the present disclosure. These are intended to be encompassed within the scope of this invention.

What is claimed is:

1. A method of preparing X-form metal phthalocyanine which comprises heating a metal phthalocyanine polymorph to from about 600° to about 650° C and allowing said polymorph to cool.

2. The method of claim 1 wherein the X-form product formed as a result of said heating is rapidly cooled to from about 10° to about 40° C.

3. The method of claim 1 wherein said metal phthalocyanine polymorph is heated to about 625° C.

4. The method of claim 1 wherein said metal phthalocyanine polymorph is cooled to about 25° C after heating.

5. The method of claim 1 wherein said metal phthalocyanine polymorph is heated uniformly at a rate of about 50° C/minute to about 160° C/minute.

6. The method of claim 1 wherein said metal phthalocyanine polymorph is heated at a rate of about 100° C/minute.

7. The method of claim 1 wherein the X-form product formed as a result of said heating is cooled at a rate of about 20° C/minute to about 200° C/minute.

8. The method of claim 1 wherein the X-form product formed as a result of said heating is cooled at a rate of about 100° C/minute.

9. The process as defined in claim 1 wherein said metal phthalocyanine polymorph is selected from the group consisting of alpha metal phthalocyanine polymorphs and beta metal phthalocyanine polymorphs.

10. A method of preparing X-form metal phthalocyanine which comprises heating a metal phthalocyanine polymorph selected from the group consisting of alpha copper phthalocyanine, beta copper phthalocyanine, alpha cobalt phthalocyanine, beta cobalt phthalocyanine, alpha lead phthalocyanine, beta lead phthalocyanine, alpha zinc phthalocyanine, beta zinc phthalocyanine, and mixtures thereof from about 600° to about 650° C and allowing said polymorph to cool.

11. A method of preparing X-form metal phthalocyanine which comprises heating a metal phthalocyanine polymorph selected from the group consisting of alpha copper phthalocyanine, beta copper phthalocyanine and mixtures thereof to form about 600° to about 650° C and allowing said polymorph to cool.

* * * * *